United States Patent
Hu et al.

(10) Patent No.: US 12,195,183 B2
(45) Date of Patent: Jan. 14, 2025

(54) ANTIMICROBIAL COATING SURFACE TREATMENT SYSTEMS AND METHODS FOR AIRCRAFT FAUCETS

(71) Applicant: GOODRICH CORPORATION, Charlotte, NC (US)

(72) Inventors: Jin Hu, Hudson, OH (US); Phi Doan, Uniontown, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 529 days.

(21) Appl. No.: 17/530,180

(22) Filed: Nov. 18, 2021

(65) Prior Publication Data

US 2022/0194589 A1    Jun. 23, 2022

Related U.S. Application Data

(60) Provisional application No. 63/127,583, filed on Dec. 18, 2020.

(51) Int. Cl.
*B64D 11/02* (2006.01)
*A01N 33/12* (2006.01)
(Continued)

(52) U.S. Cl.
CPC .............. *B64D 11/02* (2013.01); *A01N 33/12* (2013.01); *B05D 3/02* (2013.01); *B05D 3/102* (2013.01);
(Continued)

(58) Field of Classification Search
None
See application file for complete search history.

(56) References Cited

U.S. PATENT DOCUMENTS 7,754,004 B2    7/2010  Ohlhausen et al.
7,858,141 B2   12/2010  Getman et al.
(Continued)

FOREIGN PATENT DOCUMENTS

CN    104327721    2/2015
CN    105802293    7/2016
(Continued)

OTHER PUBLICATIONS

Togawa—JP 2001-295334 A—Euro D3—IDS—MT—antimicrobial coating on faucet—epoxy crosslinkds—remove excess—2001 (Year: 2001).*

(Continued)

*Primary Examiner* — John Vincent Lawler
(74) *Attorney, Agent, or Firm* — SNELL & WILMER L.L.P.

(57) ABSTRACT

A method of manufacturing an aircraft metallic faucet with an anti-microbial coating may comprise: disposing the aircraft metallic faucet in a piranha solution; washing the aircraft metallic faucet; and coating a surface of the aircraft metallic faucet with a Si-Quat based coating. A method of manufacturing an aircraft metallic faucet with a hybrid anti-microbial coating with cross-linkers may comprise: disposing the aircraft metallic faucet in a piranha solution; washing the aircraft metallic faucet; coating a surface of the aircraft metallic faucet with a hybrid Si-Quat coating with crosslinkers; and curing the hybrid Si-Quat coating at a temperature between 60° C. (140° F.) and 100° C. (212° F.).

19 Claims, 8 Drawing Sheets

(51) Int. Cl.

| | | |
|---|---|---|
| *B05D 3/02* | (2006.01) | |
| *B05D 3/10* | (2006.01) | |
| *C09D 5/14* | (2006.01) | |
| *C23G 1/08* | (2006.01) | |
| *E03C 1/04* | (2006.01) | |
| *E03C 1/10* | (2006.01) | |

(52) U.S. Cl.
CPC .............. *C09D 5/14* (2013.01); *C23G 1/081* (2013.01); *B05D 2202/15* (2013.01); *E03C 1/04* (2013.01); *E03C 1/108* (2013.01)

(56) References Cited

U.S. PATENT DOCUMENTS

| | | | |
|---|---|---|---|
| 8,735,618 | B2 | 5/2014 | Ludwig et al. |
| 8,979,996 | B2 | 3/2015 | Standke et al. |
| 9,764,264 | B2 | 9/2017 | Peterson, II et al. |
| 2005/0266235 | A1 | 12/2005 | Masayuki et al. |
| 2007/0100110 | A1 | 5/2007 | Scheim et al. |
| 2010/0028462 | A1* | 2/2010 | Bolkan .................. A01N 55/00 424/717 |
| 2011/0271873 | A1 | 11/2011 | Ohlhausen et al. |
| 2016/0295858 | A1 | 10/2016 | Joseph et al. |
| 2020/0352170 | A1* | 11/2020 | Grossman ............ C09D 179/02 |

FOREIGN PATENT DOCUMENTS

| | | | | |
|---|---|---|---|---|
| CN | 105802293 | A * | 7/2016 | .............. C09D 4/00 |
| EP | 1741773 | | 1/2007 | |
| JP | 2001295334 | | 10/2001 | |
| JP | 2001295334 | A * | 10/2001 | ............ C23C 28/00 |
| JP | 2011072868 | | 4/2011 | |
| JP | 2011072868 | A * | 4/2011 | .............. B05D 5/00 |
| WO | 2010049316 | | 5/2010 | |
| WO | 2011026093 | | 3/2011 | |
| WO | 2011032845 | | 3/2011 | |
| WO | 2021066934 | | 4/2021 | |

OTHER PUBLICATIONS

Watanabe—JP 2011-072868 A—IDS—MT—Quat-silane coating—fig w—single layer—degrease w—nitric acid—2011 (Year: 2011).*
Wang—CN 105802293 A—Euro D4—MT—cleaning of surfaces—piranha and rinse to remove unreacted silane—2018 (Year: 2018).*
Zhao—microorganisms on aircraft surfaces—risks—Travel Med.& Infect.—2019 (Year: 2019).*
European Patent Office; European Search Report dated May 2, 2022 in Application No. 21215526.1.
Clarkson, et al., "Further Studies Investigating a Potential Non-Leaching Biocide using the Marine Fouling Diatom Amphora Coffeaeformis", Biofouling: The Journal of Bioadhesion and Biofilm Research, Taylor & Francis, GN, vol. 9, No. 1, Jan. 1, 1995 (Jan. 1, 1995), pp. 17-30.

* cited by examiner

ANTIMICROBIAL COATING SURFACE TREATMENT SYSTEMS AND METHODS FOR AIRCRAFT FAUCETS

CROSS-REFERENCE TO RELATED APPLICATIONS

This application is a non-provisional of, and claims priority to, and the benefit of U.S. Provisional Application No. 63/127,583, entitled "ANTIMICROBIAL COATING SURFACE TREATMENT SYSTEMS AND METHODS FOR AIRCRAFT FAUCETS," filed on Dec. 18, 2020, which is hereby incorporated by reference in its entirety for all purposes.

FIELD

The present disclosure relates to antimicrobial surface treatment, in particular, systems and methods of surface treatment for use with aircraft faucets.

BACKGROUND

Mold and contamination of bacteria and virus on faucets, particularly its aerator, can result in water from faucet failing water bacteria tests and can impact the safety of passengers and crew members flying on aircraft and can also include grounding of aircraft. Mold on faucets may form and combine with bacteria and viruses. The safety of such passengers and crew members may be improved by treating interior and exterior surfaces of faucets—with antimicrobial treatments capable of mitigating the presence of the bacteria, virus and mold on such surfaces. Nano-silver based coatings or surface treatments are widely available and are very effective as antimicrobials as they suppress or inhibit a wide spectrum of bacteria, molds, fungi and viruses. Such coatings, however, are expensive and present significant environmental challenges.

SUMMARY

A method of manufacturing an aircraft metallic faucet with an anti-microbial coating is disclosed herein. The method may comprise: disposing the aircraft metallic faucet in a piranha solution; washing the aircraft metallic faucet; and coating a surface of the aircraft metallic faucet with a Si-Quat coating.

In various embodiments, coating the surface may further comprise disposing the surface in a Si-Quat solution. Coating the surface may further comprise curing casted Si-Quat solution at a temperature between 60° C. (140° F.) and 100° C. (212° F.) to form the Si-Quat. Curing the Si-Quat or hybrid Si-Quat coating may be performed for at least 24 hours. Coating the surface may further comprise coating the surface via drop casting or dip casting. The Si-Quat coating may comprise approximately 2% $(OH)_3$—Si-Quat. The aircraft metallic faucet may be a stainless steel component.

A method of manufacturing an aircraft metallic faucet with an antimicrobial coating or hybrid anti-microbial coating with cross-linkers is disclosed herein. The method may comprise: disposing the aircraft metallic faucet in a piranha solution; washing the aircraft metallic faucet; coating a surface of the aircraft metallic faucet with a Si-Quat coating or hybrid Si-Quat coating with crosslinkers; and curing the Si-Quat coating at a temperature between 60° C. (140° F.) and 100° C. (212° F.).

The Si-Quat coating may comprise a weight ratio of Si-Quat:alkoxysilanes of between 1:1 and 2:1. A Si-Quat in the Si-Quat coating with crosslinkers may comprise (MeO)$_3$—Si-Quat and the alkoxysilanes comprises R—Si—(OEt)$_3$ (R=Me, EtO, Octyl, perfluorooctyl). The aircraft metallic faucet may be a stainless steel component. The method may further comprise preparing a Si-Quat solution with crosslinkers prior to coating the surface of the aircraft metallic faucet. Preparing the Si-Quat solution with crosslinkers may include mixing (MeO)$_3$—Si-Quat with MeOH, excess water, and one of tetraethoxysilane, octyltriethoxysilane, methyltriethoxysilane and perfluorooctyl. The surface may be an interior surface of the aircraft metallic faucet. The aircraft metallic faucet may include an aerator for an aircraft faucet system, the aerator coated being in accordance with the aircraft metallic faucet.

An aircraft metallic faucet is disclosed herein. The aircraft metallic faucet may comprise: a surface; and an anti-microbial coating with crosslinkers disposed on the surface.

In various embodiments, the anti-microbial coating with crosslinkers has a contact angle greater than 90 degrees. The aircraft metallic faucet may be a stainless steel component. The hybrid anti-microbial coating may comprise a weight ratio of Si-Quat:Alkoxysilanes of between 1:1 and 2:1. A Si-Quat in the hybrid anti-microbial coating may comprise (MeO)$_3$—Si-Quat and the alkosyilanes comprises R—Si—(OEt)$_3$ (R=Me, EtO, Octyl, Perfluorooctyl).

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
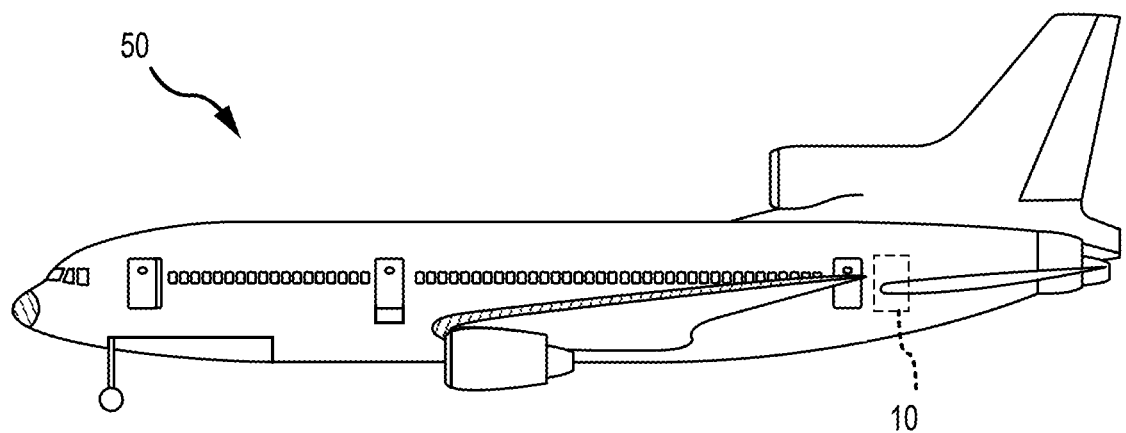
FIG. 1 illustrates an aircraft having a lavatory, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Disclosed herein, according to various embodiments, is a solenoid valve having a non-sliding plunger assembly. That is, the solenoid valve disclosed herein generally includes a plunger assembly that is moveably suspended within an internal chamber of a housing of the solenoid valve away from any sliding contact with adjacent surfaces. Although details and examples are included herein pertaining to implementing the solenoid valve in a faucet system/manifold for an aircraft lavatory, the present disclosure is not necessarily so limited, and thus aspects of the disclosed embodiments may be adapted for performance in a variety of other industries. As such, numerous applications of the present disclosure may be realized.

The following terms as used in this application are to be defined as stated below and for these terms, the singular includes the plural: $(OH)_3$—Si-Quat: 3-(Trihydroxysilyl)propyldimethyloctadecyl ammonium chloride; $(MeO)_3$—Si-Quat: Octadecyldimethyl(3-trimethoxy silylpropyl)ammonium chloride; and Si-Quat: silyl-containing reactive quaternary ammonium such as $(OH)_3$—Si-Quat or $(MeO)_3$—Si-Quat.

Figure 2:
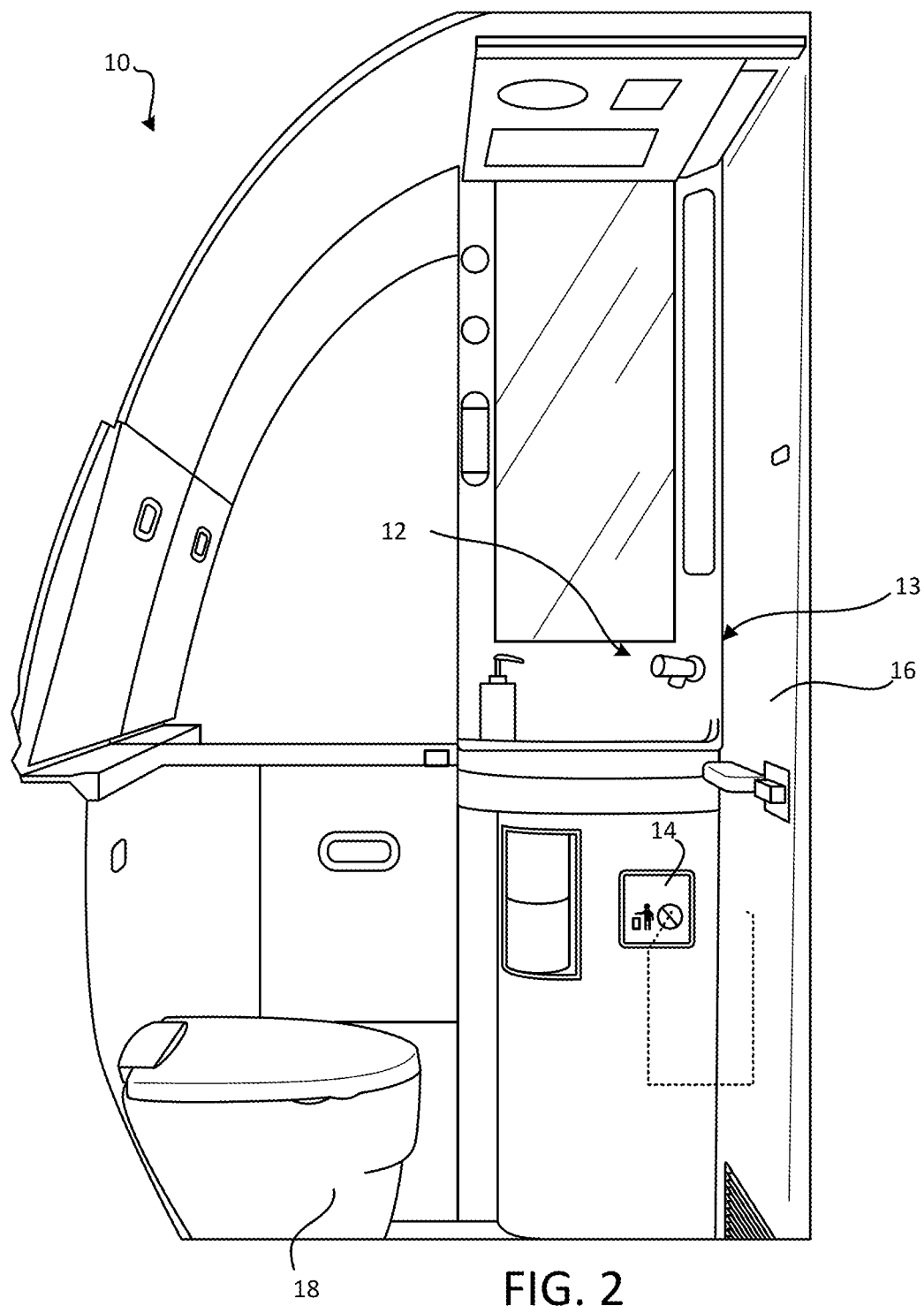
FIG. 2 illustrates a perspective view of an aircraft lavatory, in accordance with various embodiments.

In various embodiments, and with reference to FIGS. 1 and 2, an aircraft 50 may include aircraft lavatory 10. The aircraft lavatory 10 may include a washbasin (e.g., a sink) 12 with a faucet system 13, a trash receptacle 14, a door 16, and a toilet 18, among other features. The faucet system 13 may include a faucet manifold that includes one or more solenoid valves in hot and/or cold water lines, and an aerator. The faucet system 13 may include several joints, often around a respective aerator joint. Bacteria and viruses may contaminate an aerator, which may grow the respective pathogen inward to nearby interior walls of the faucet system. In this regard, typical faucet systems may be susceptible to mold growing in or around faucet joints. Thus, the non-antimicrobial surface treatment systems and methods disclosed herein and described in greater detail below may have various health, safety, and aesthetic benefits over conventional faucet systems, according to various embodiments.

Reactive quaternary ammonium ion-based compounds (referred to herein as "-quats") have the ability to react and attach themselves to activated metal surfaces and to form molecular films or coatings for long lasting and non-leaching antimicrobial surface treatments. In this disclosure, reactive quats are proposed for an antimicrobial molecular layer or coatings for exposed surfaces within an aircraft—e.g., the metallic surfaces of lavatory such as sinks or faucets or similar surfaces that are subject to exposure to bacteria, viruses or pathogens transmitted, for example, by human touch, by airborne means, or by still water. With respect to various embodiments, a representative reactive quat is described—a reactive silane quaternary ammonium ion-based antimicrobial (referred to herein as "Si-Quat"). Si-Quat is beneficial for manufacturing a hybrid anti-microbial coating and molecular layer with small silane crosslinkers for high density crosslinking or hydrophobic non-ionic crosslinker with long alkyl chain or fluorocarbon chain for higher contact water angle during manufacturing of aircraft components, such as faucets, or the like. In various embodiments, the increased hydrophobicity (high contact water angle) from a hydrophobic crosslinker will enhance non-sticking of bacteria and virus on protected surfaces, and quaternary ammonium from Si-Quat will kill adhered pathogens.

In various embodiments, interior and exterior surfaces of faucets and aerator metal surfaces may be coated or treated with crosslinking networks of Si-Quats. The coating or molecular layer thin film may prevent growth of black mold and may reduce pathogen adhesion and kill pathogen contamination on the aerator and interior and exterior metal surfaces of the faucets, in various embodiments. The hybrid coating and molecular layer thin film may reduce bacteria test failure rate for the water from a faucet, in accordance with various embodiments. To increase crosslinking density for hybrid coating robustness, small silane crosslinkers tetra alkoxysilanes, such as $Si(OR)_4$ ($R=CH_3$, $C_2H_5$, $C_3H_7$), or tetraachrosilane $SiCl_4$, or dichloro silane $SiCl_2R_2$, diakoxysilane $Si(OR)_2R''_2$ or $Si(OR)_3R''$ ($R=CH_3$, $C_2H_5$, $R''=CH_3$) are mixed with a Si-Quat. In various embodiments, hydrophobic crosslinkers $Si(OR')_3R''$ ($R'=CH_3$, $C_2H_5$, $R''=$Octyl, Perfluorooctyl) may be mixed with a Si-Quat for non-sticking of pathogens.

Typical silane quats (Si-Quats) include the following, which are functionalized with reactive alkoxy silane or hydroxylsilane: (i) 1-octadecanaminium, N,N-dimethyl-N-(3-(trimethoxsil)propyl)chloride; (ii) 1-tetradecanaminium, N,N-dimethyl-N-(3-(trimethoxysilyl)propyl)chloride; (iii) 1-decanaminium, Ndidecyl-N-methyl-N-(3-(trimethoxysilyl)propyl)chloride; and (iv) 1-ocatdecananminium, N,N-dimethyl-N-(3-(trihydroxysilyl)propyl)chloride. The last of these reactive Si-Quats, 1-ocatdecananminium, N,N-dimethyl-N-(3-(trihydroxysilyl)propyl)chloride, may be created in situ by combining the first of the reactive quats, 1-octadecanaminium, N,N-dimethyl-N-(3-(trimethoxsil)propyl)chloride, with water. Its representative chemical structure is illustrated in FIG. 3.

In various embodiments, high hydrophobicity of the hybrid coatings and molecular layer disclosed herein from hydrophobic crosslinkers may benefit to reduce pathogen adhesion on the protected surfaces and/or reduce scale build up. The hybrid coatings and molecular layer can be applicable for various metallic surfaces, or the like.

Figure 3:
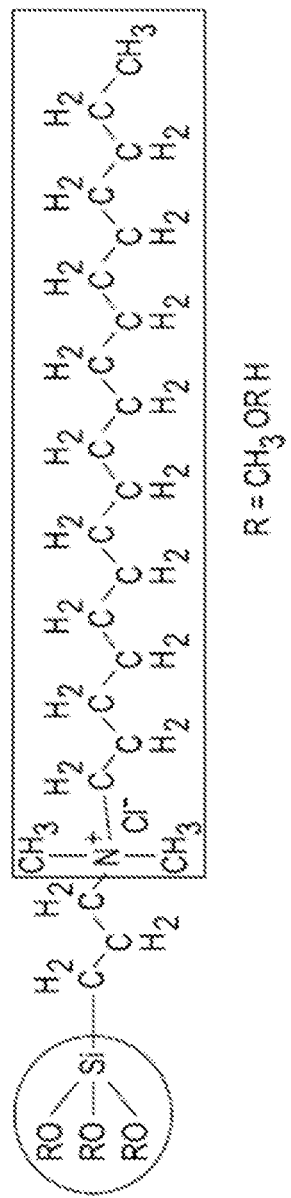
FIG. 3 illustrates a chemical composition for a reactive quat, in accordance with various embodiments.

Referring to FIG. 3, the active ingredient of the compound comprises a quaternary ammonium ion as illustrated in the right-side box of FIG. 3. The positively charged nitrogen atom (N+) attracts negatively charged microbes, which are then destroyed or killed by the Si-Quat. More specifically, the proteins (or the spike proteins) on the outer surface of the SARS-COV-2 virus have been calculated to be negatively charged under neutral pH conditions. Thus, the SARS-COV-2 is electrically attracted to the Si-Quat. When attracted to the Si-Quat, the long molecular carbon or alkyl chain (also referred to as a spike or a sword) comes into contact with the offending microbe or virus. The carbon or alkyl chain then acts like a sword that punctures the outer membrane or coating of the microbe or virus coming in contact with it. For the SARS-COV-2 virus, the hydrophilic envelope surrounding the virus is penetrated by the carbon or alkyl chain, thereby terminating the viability of the virus. Still referring to FIG. 3, the reactive silane or silyl group $(RO)_3Si$— ($R=CH_3$ or OH) of the Si-Quat is illustrated in the left-side box. The silane moieties covalently bind to activated metallic surfaces creating either a grafted molecular layer or a coating with antimicrobial properties. Further, since each silicon atom has three reactive groups, the spare reactive group after bonding to a surface can also bridge to neighboring silicon atoms in the compound, resulting in a robust antimicrobial surface treatment on the surface. A "molecular layer," as described herein, is a layer that is approximately one quat thick (e.g., a quat thick plus or minus 20%), in accordance with various embodiments.

Figure 4A:
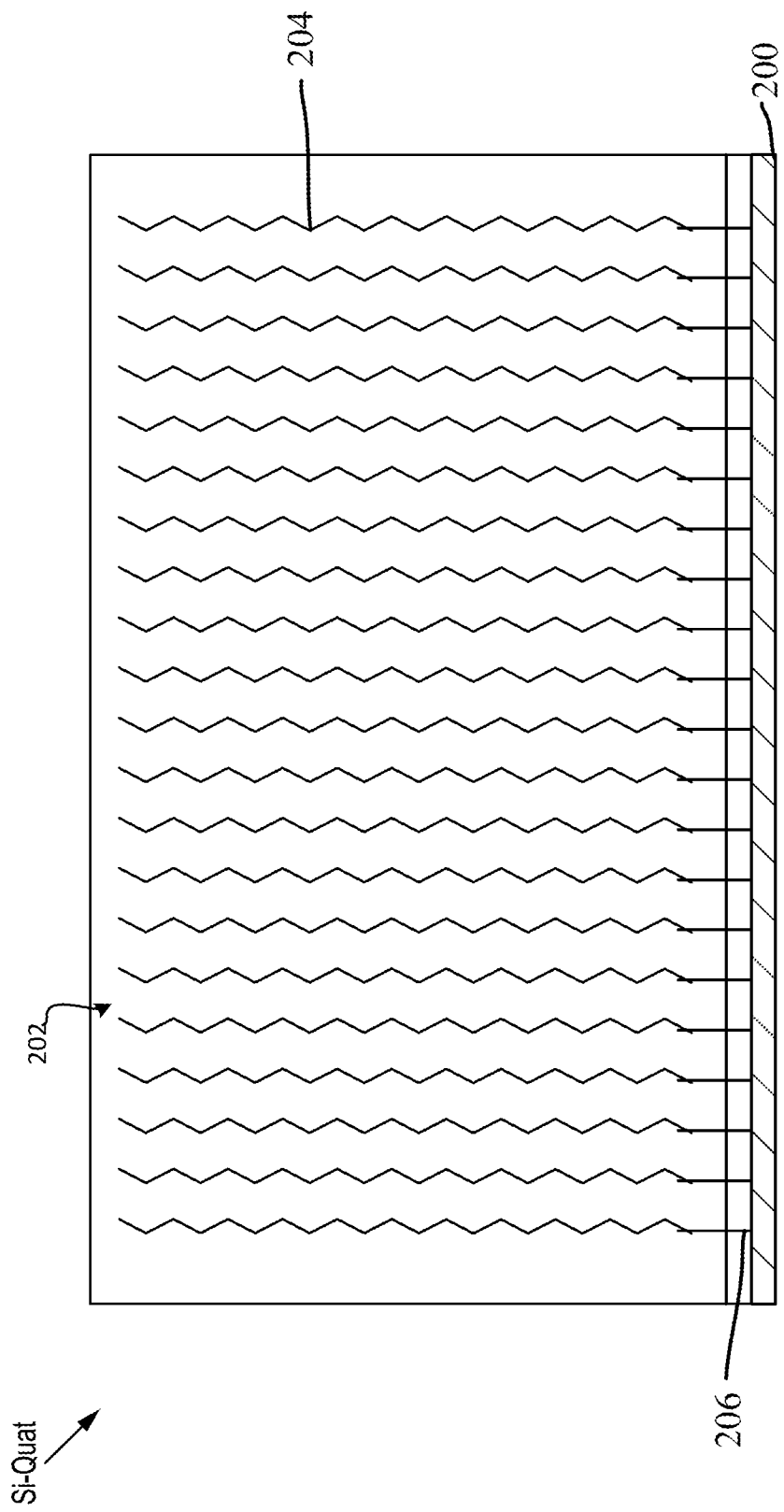
FIG. 4A illustrates a surface portion of a component having a grafted idealized full covered and fully crosslinked Si-quat molecular layer applied thereon, in accordance with various embodiments.

Referring now to FIG. 4A, a surface 200 having Si-Quat molecular layer 202 is illustrated. As described above, the Si-Quat molecular layer 202 comprises a plurality of spikes 204 in the form of quaternary ammonium ions having long molecular carbon or alkyl chains, with each spike being attached to the surface 200 via a silane group 206. In various embodiments, the surface 200 may represent an exterior or interior surface of a faucet in faucet system 13 from FIG. 2 (or another faucet surface exposed to water) found on an aircraft, such as, for example, an aerator. Further applicable components on an aircraft include metal handles or the like. In various embodiments, the surface 200 may comprise metals, such as, for example, aluminum, stainless steel or galvanized metal surfaces.

Figure 4B:
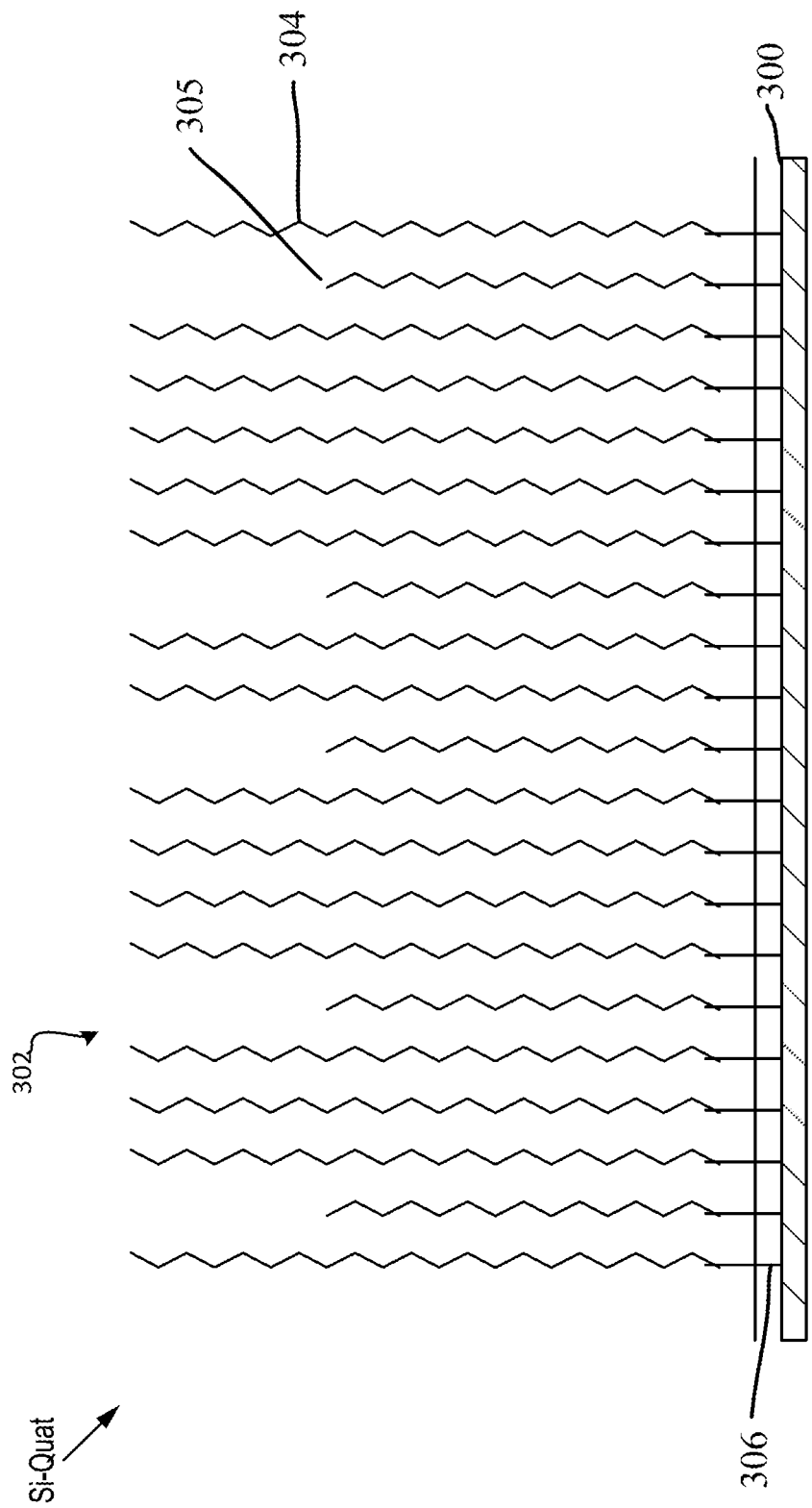
FIG. 4B illustrates a surface portion of a component having a grafted idealized full covered and fully crosslinked hybrid Si-Quat molecular layer applied thereon, in accordance with various embodiments.

Referring now to FIG. 4B, a surface 300 having a hybrid molecular layer 302 is illustrated. As described above, the hybrid molecular layer 302 comprises a plurality of long spikes 304 in the form of quaternary ammonium ions having long molecular carbon or alkyl chains, with each spike 304 being attached to the surface 300 via a silane group 306. Short spike (305) represents silane crosslinker being attached to the surface 320 via silane group 306 and neighboring silicon atom. In various embodiments, short spike 305 has a shorter length relative to long spike 304. In various embodiments, the surface 300 may represent an exterior or interior surface of a faucet in faucet system 13 from FIG. 2 (or another faucet surface exposed to water) found on an aircraft, such as, for example, an aerator. Further applicable components on an aircraft include metal handles or the like. In various embodiments, the surface 300 may comprise metals, such as, for example, aluminum, stainless steel or galvanized metal surfaces.

Figure 4C:
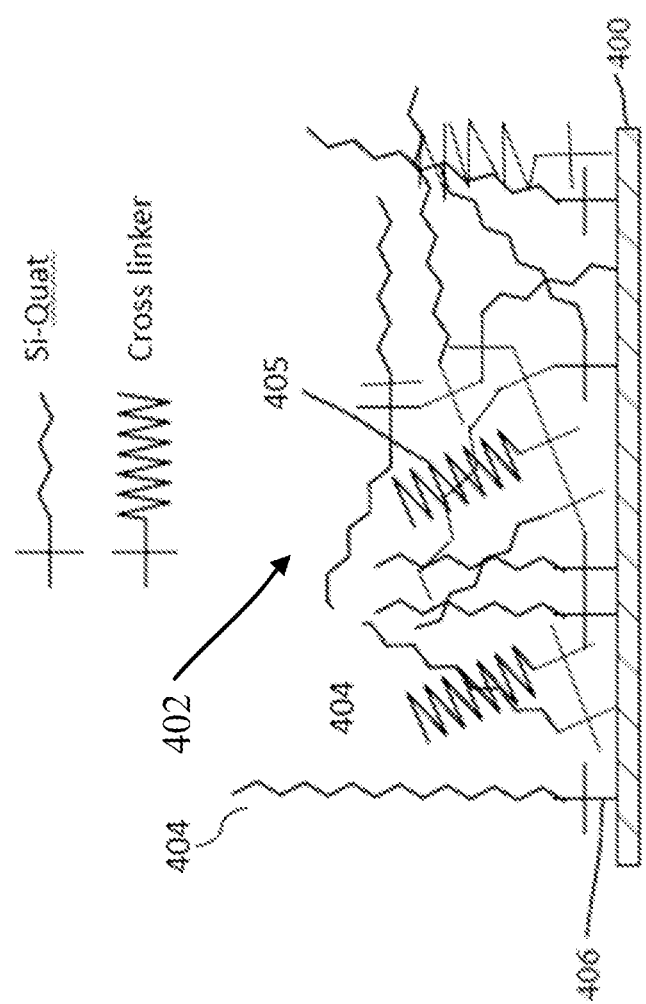
FIG. 4C illustrates a surface portion of a component having hybrid Si-quat surface coating applied thereon, in accordance with various embodiments.

Referring now to FIG. 4C, a surface 400 having a hybrid coating 402 is illustrated. As described above, the hybrid coating 402 comprises a plurality of spikes or tails 404 (Si-Quat) in the form of quaternary ammonium ions having long molecular carbon or alkyl chains, with each spike or tail being attached to the surface 400 via a silane group 406 or being linked or crosslinked in side of coating off the metal surfaces. The crosslinkers 405 are also being either attached to the surface 400 via a silane group 406 or being linked or crosslinked in side of coating. Crosslinkers 405 may increase cross linker density, while a long chain hydrophobic crosslinker may increase the coating hydrophobicity, in accordance with various embodiments. In various embodiments, the surface 400 may represent an exterior or interior surface of a faucet in faucet system 13 from FIG. 2 (or another faucet surface exposed to water) found on an aircraft, such as, for example, an aerator. Further applicable components on an aircraft include metal handles or the like. In various embodiments, the surface 200 may comprise metals, such as, for example, aluminum, stainless steel or galvanized metal surfaces.

Figure 5:
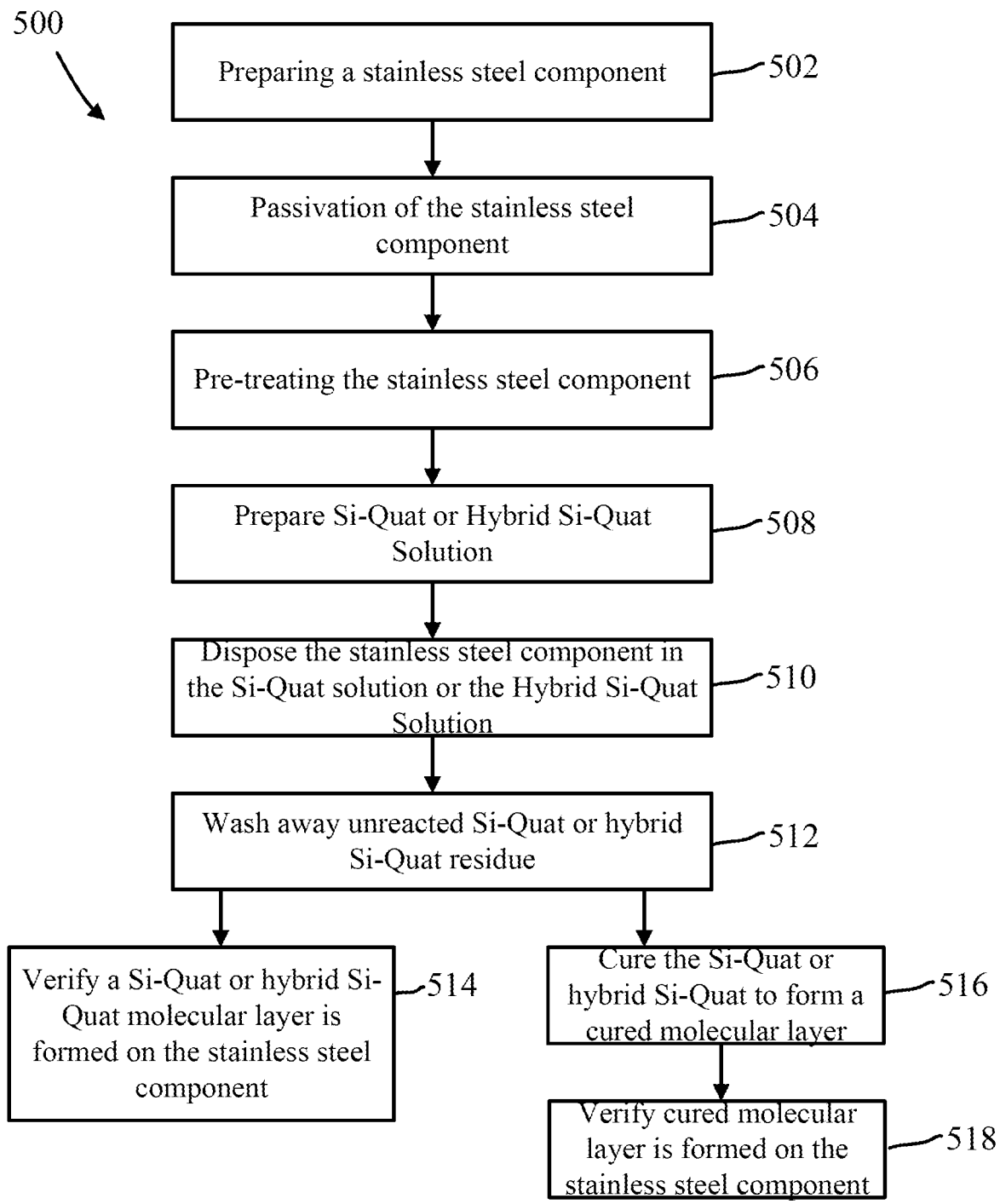
FIG. 5 illustrates a method of manufacturing a stainless steel component with an anti-microbial molecular layer, in accordance with various embodiments.

Referring now to FIG. 5 a method 500 of manufacturing a stainless steel component with an anti-microbial grafted molecular layer is illustrated, in accordance with various embodiments. The method 500 may comprise preparing a stainless steel component for pre-treatment (step 502). In various embodiments, if the stainless steel component includes a protective adhesive film, the protective adhesive film may be removed by any method known in the art. In various embodiments, preparation of the stainless steel component may further comprise soaking the stainless steel component in toluene for between 12 and 48 hours. In various embodiments, preparing the stainless steel component in accordance with step 502 may result in a less corrosive stainless steel component relative to before pre-treatment.

In various embodiments, the method 500 may further comprise a passivation process for the stainless steel component (step 504). In various embodiments, the passivation process may be configured to make the stainless steel component more reactive relative to prior to the passivation process. For example, if a surface does not have hydroxy, it may be more difficult to react with a Si-Quat. In various embodiments, the passivation process may comprise preparing a concentrated nitric acid bath (e.g., a 25% nitric acid bath or the like). The stainless steel component may be disposed in the nitric acid bath and heated to between 120° F. and 140° F. (35° C. to 46° C.) for between 20 and 40 minutes, or approximately 30 minutes. In various embodiments, the nitric acid bath is then allowed to return to room temperature, the stainless steel component is removed, and the stainless steel component is washed with three-times de-ionized water. In various embodiments, a hydroxy group may be increased on a surface of the stainless steel component, in accordance with various embodiments. In this regard, the stainless steel component may include enhances reactivity after step 504.

In various embodiments, the method 500 may further comprise pre-treating the stainless steel component with a piranha treatment (step 506). In various embodiments, the stainless steel component may comprise aircraft grade stainless steel, such as steel conforming to AMS 2700, 304 stainless steel, 316 stainless steel, 304 stainless steel, 904 stainless steel, or the like In various embodiments, the piranha solution is a mixture of sulfuric acid ($H_2SO_4$), water, and hydrogen peroxide ($H_2O_2$). In various embodiments, the piranha solution may include a 70-90% sulfuric acid solution, a 30-35% hydrogen peroxide solution, and water at a ratio of approximately 2:1 mixture of sulfuric acid solution with hydrogen peroxide solution. In various embodiments, the stainless steel component may be disposed in the piranha solution and heated to between 140° F. and 150° F. (60° C. and 65° C.) for approximately ten minutes. In various embodiments, the stainless steel component may then be washed with de-ionized water followed by acetone and allowed to dry. In various embodiments, step 506 may further increase the hydroxy group on the surface of the stainless steel component. In various embodiments, step 506 may increase a hydrophobicity of the surface of the stainless steel component, in accordance with various embodiments. In various embodiments, the heat during curing may result in improved condensation and curing of the Si-Quat.

In various embodiments, the method 500 further comprises preparing a Si-Quat solution (step 508). For example, in various embodiments, a 5% $(OH)_3$—Si-Quat may be diluted in water to approximately 2% with de-ionized water to form the Si-Quat solution. In various embodiments, 5% $(OH)_3$ Si-Quat may be commercially available from Gelest Incorporated from Morrisville, PA under the name HM4005 Antimicrobial.

In various embodiments, the method 500 further comprises treating the stainless steel component with the Si-Quat solution (step 510). The molecular layer may be performed by any method, such as soaking in the Si-Quat containing solutions.

In various embodiments, the method 500 further comprises removing the stainless steel component from the Si-Quat solution and washing the stainless steel component (step 512). In various embodiments, a stainless steel component removed from the 1% (OH)$_3$ Si-Quat solution may be washed with de-ionized water and acetone. In various embodiments, a stainless steel component removed from the 1% (OH)$_3$—Si-Quat solution may be washed with di-ionized water and acetone.

In various embodiments, the method 500 further comprises preparing a hybrid Si-Quat solution (step 508), i.e. Si-Quat with small silane crosslinkers or long chain hydrophobic crosslinkers. For example, in various embodiments, a 72% (MeO)$_3$—Si-Quat solution may be diluted in MeOH to approximately 1% and adjusted to a pH between 2 and 3 by using HCl dilute in de-ionized water to form the Si-Quat solution and mixed with alkoxysilane, such as R—Si—(OEt)$_3$ (R=Me, EtO, Octyl, perfluorooctyl) to form a hybrid Si-Quat solution with crosslinkers. In various embodiments, a 72% (MeO)$_3$—Si-Quat may be commercially available from Gelest Incorporated under the name HM4072 Antimicrobial. Similarly, tetraethoxysilane, octyltriethoxysilane, and methyltriethoxysilane may be commercially available from Gelest Incorporated. In various embodiments, a weight ratio between the (MeO)$_3$—Si-Quat to alkoxysilane may be between 1:1 and 1:2, in accordance with various embodiments.

In various embodiments, the Si-Quat or hybrid Si-Quat may be grafted to the surface of the stainless steel component in response to steps 506, 508, 510, 512. "Grafted," as disclosed herein refers to growing or joining together (e.g., via covalent bonding).

In various embodiments, the method 500 may further comprise verifying the Si-Quat molecular layer has been grafted on the surface of the stainless steel component (step 514). In various embodiments, the Si-Quat molecular layer may be verified (e.g., by any method known in the art).

In various embodiments, the method 500 may comprise curing the Si-Quat or hybrid —Si Quat on the stainless steel component (step 516) after washing away the unreacted Si-Quat or hybrid residue in step 512. In various embodiments, curing the Si-Quat or hybrid Si-Quat on the stainless steel component at higher temperatures results in treated surfaces with a greater hydrophobicity and more robust molecular layer in step 516. In various embodiments, the Si-Quat or hybrid Si-Quat molecular layer may be cured at a temperature between 60° C. (140° F.) and 100° C. (212° F.) for between 16 and 32 hours, or approximately 24 hours.

In various embodiments, the method 500 may further comprise verifying the Si-Quat or hybrid Si-Quat molecular layer has been formed in step 516 on the surface of the stainless steel component (step 518). In various embodiments, the Si-Quat treated surfaces may be verified by any method known in the art, such as analyzing bacteria reduction efficiency.

Antimicrobial tests of hydroyl-activated Stainless steel plates covalent-bonded with molecular layer 3-(Trihydroxysilyl)propyldimethyloctadecyl ammoniumchloride and their antimicrobial tests are shown below in Table 1.

TABLE 1

Antimicrobial Test Results

| Stainless Steel Substrates | Surface hydroxyl activation | Grafting molecular layer of Si-Quat | E-Coli reduction test Per JIS Z 2801: 2010 in comparison with SS substrate control |
|---|---|---|---|
| SS316 bead blasted - McMaster 88885K24, blasted, nitric acid Passivated | piranha treated | soaked into HM4005* (diluted to 2.5%) overnight, rinsed off excess HM4005, cured at oven 85 C. (185 F.) 24 hours | 97% |
| SS316 brushed - McMaster 9745K74, nitric acid passivated | piranha treated | soaked into HM4005* (diluted to 2.5%) overnight, rinsed off excess HM4005, cured at oven 85 C. (185 F.) 24 hours | 95% |
| SS304 brushed - McMaster 9748K24, nitric acid passivated | piranha treated | soaked into HM4005* (diluted to 2.5%) overnight, rinsed off excess HM4005, cured at oven 85 C. (185 F.) 24 hours | 96% |

*Gelest HM 4005: 3-(Trihydroxysilyl)propyldimethyloctadecyl ammoniumchloride, 5% aqueous solution.

Figure 6:
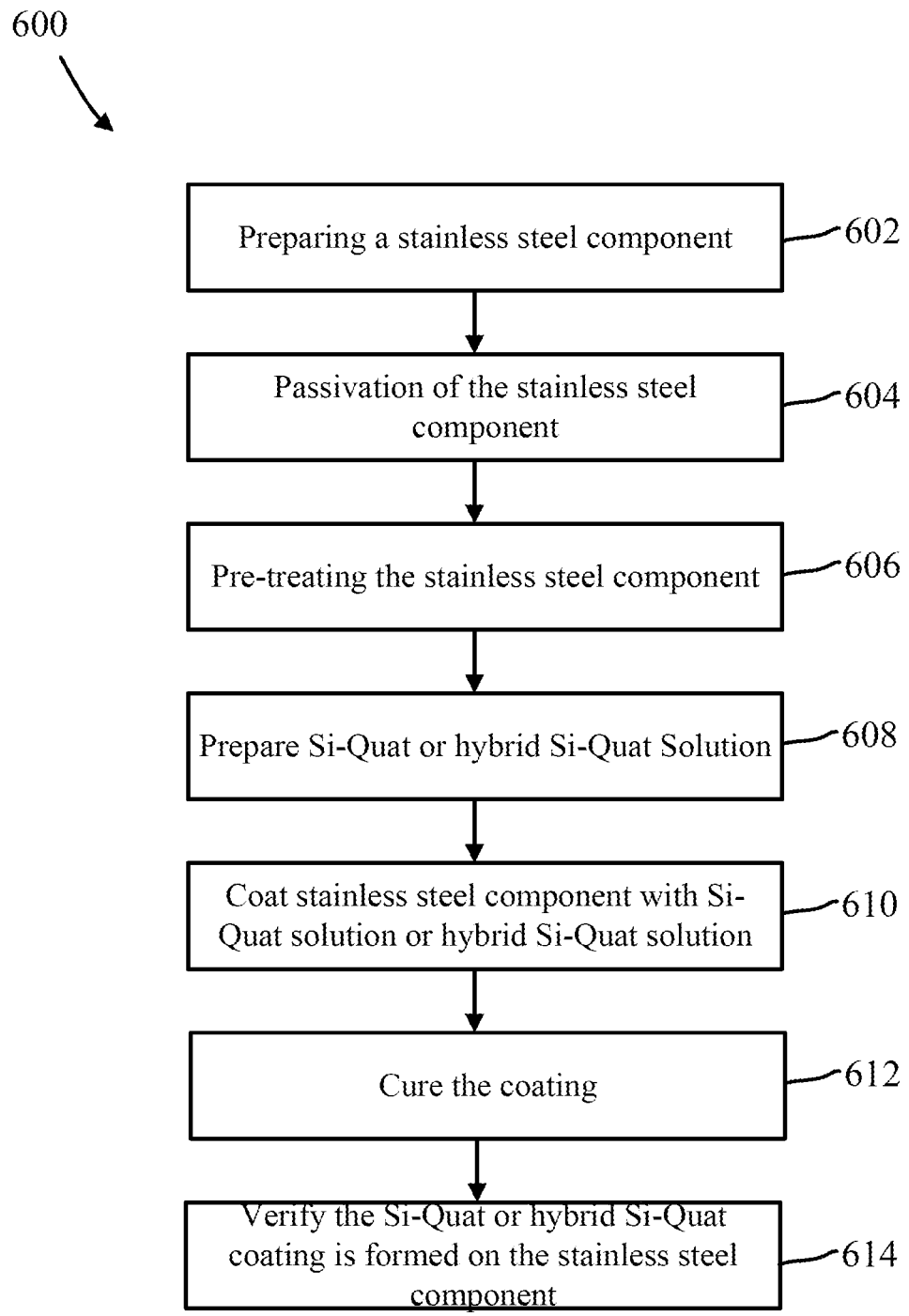
FIG. 6 illustrates a method of manufacturing a stainless steel component with an anti-microbial coating with/without additional crosslinkers.

Referring now to FIG. 6, a method 600 of manufacturing a stainless steel component with a Si-Quat or a hybrid Si-Quat anti-microbial coating with silane crosslinkers is illustrated, in accordance with various embodiments. The method 600 may comprise preparing a stainless steel component for pre-treatment (step 602). In various embodiments, if the stainless steel component includes a protective adhesive film, the protective adhesive film may be removed by any method known in the art. In various embodiments, preparation of the stainless steel component may further comprise soaking the stainless steel component in toluene for between 12 and 48 hours. In various embodiments, preparing the stainless steel component in accordance with step 602 may result in a less corrosive stainless steel component relative to before pre-treatment.

In various embodiments, the method 600 may further comprise a passivation process for the stainless steel component (step 604). In various embodiments, the passivation process may be configured to make the stainless steel component more reactive relative to prior to the passivation process. For example, if a surface does not have enough hydroxy, it may be more difficult to react with a Si-Quat or hybrid Si-Quat. In various embodiments, the passivation process may comprise preparing a concentrated nitric acid bath (e.g., a 25% nitric acid bath or the like). The stainless steel component may be disposed in the nitric acid bath and heated to between 120° F. and 140° F. (49° C. to 60° C.) for between 20 and 40 minutes, or approximately 30 minutes. In various embodiments, the nitric acid bath is then allowed to return to room temperature, the stainless steel component is removed, and the stainless steel component is washed with three-times de-ionized water. In various embodiments, a hydroxy group may be increased on a surface of the stainless steel component, in accordance with various embodiments. In this regard, the stainless steel component may include enhances reactivity after step 604.

In various embodiments, the method 600 may further comprise pre-treating the stainless steel component with a piranha treatment (step 606). In various embodiments, piranha solution is a mixture of concentrated sulfuric acid ($H_2SO_4$), water, and concentrated hydrogen peroxide ($H_2O_2$). In various embodiments, the piranha solution may include a 70-90% sulfuric acid solution, a 30-35% hydrogen peroxide solution, and water at a ratio of approximately 2:1 mixture of the concentrated sulfuric solution with the concentrated hydrogen peroxide. In various embodiments, the stainless steel component may be disposed in the piranha solution and heated to between 140° F. and 150° F. (60° C. and 65° C.) for approximately ten minutes. In various embodiments, the stainless steel component may then be washed with de-ionized water followed by acetone and allowed to dry. In various embodiments, step 606 may further increase the hydroxy group on the surface of the stainless steel component. In various embodiments, step 606 may increase a hydrophobicity of the surface of the stainless steel component, in accordance with various embodiments. In various embodiments, the heat during curing may result in improved condensation and curing of the Si-Quat and hybrid Si-Quat coating. In various embodiments, after piranha treatment, the stainless steel can further soak in SIT7110.0 from Gelest Incorporated, tetraethoxysilane, oligomeric hydrolysate liquid overnight, then rinse with acetone and dry in an oven at 85° C. for 24 hours to modify the surfaces with reactive —Si(OEt) or Si(OH) to be covalently grafted with Si-Quat in Step 608. This step may improve the retaining of Si-Quat or hybrid Si-Quat coating solution on the steep stainless steel surfaces.

In various embodiments, the method 600 further comprises preparing a hybrid Si-Quat solution with crosslinkers (step 608). For example, in various embodiments, a 72% $(MeO)_3$—Si-Quat solution may be diluted in MeOH to approximately 1% and adjusted to a pH between 2 and 3 by using HCl dilute in de-ionized water to form the Si-Quat solution and mixed with alkoxysilane, such as R—Si—$(OEt)_3$ (R=Me, EtO, Octyl, perfluorooctyl) to form a hybrid Si-Quat solution with crosslinkers. In various embodiments, a 72% $(MeO)_3$—Si-Quat may be commercially available from Gelest Incorporated under the name HM4072 Antimicrobial. Similarly, tetraethoxysilane, octyltriethoxysilane, and methyltriethoxysilane may be commercially available from Gelest Incorporated. In various embodiments, a weight ratio between the $(MeO)_3$—Si-Quat to alkoxysilane may be between 1:1 and 1:2, in accordance with various embodiments.

In various embodiments, the method further comprises coating the stainless steel component with the hybrid Si-Quat solution with crosslinkers (step 610). The hybrid coating may be performed by any method, such as drop casting, spin coating, dip coating, spray coating, Langmuir-Blodgett deposition, substrate/particle surface functionalization, or the like. In various embodiments, the coating may be performed by drop casting.

In various embodiments, the method 600 may comprise curing the hybrid Si-Quat coating with crosslinkers on the stainless steel component (step 612). In various embodiments, curing the hybrid coating on the stainless steel component at higher temperatures with a ratio of Si-Quat: Alkoxysilanes between 1:1 and 1:2 results in a coating with a greater hydrophobicity for the coating. For example, a table of contact angles of stainless steel coated with various ratios of Si-Quat:R—Si—$(OEt)_3$ is illustrated.

TABLE 2

Contact angle of stainless steel coated with various ratios of Si-Quat:R—Si—(OEt)3

| Ratio | Before Cure (RT for 1 day) | | | After Cure (80° C.) for 24 hours | | |
|---|---|---|---|---|---|---|
| (MeO)3—Si-Quat:R—Si—(OEt)$_3$ | R = OEt | R = Me | R = Octyl | R = OEt | R = Me | R = Octyl |
| 1:1 | 90 | 80 | 90 –> 45 | 90 | 92 | 101 |
| 2:1 | 92 | 82 | 90 –> 48 | 89 | 94 | 106 |

As indicated above, for R=Octyl, the water contact angle reduced as the water wetted the coating, which is likely due to residual in the alkoxy groups. "Contact angle" as described herein refers to a measurement through a liquid, where a liquid-vapor interface meets a solid surface. As shown above, a 1:1 of Si-Quat:Octyl-Si$(OEt)_3$ had an initial contact angle of 90 degrees then reduced to 45 degrees as the water wetted the surface. Upon curing at 80° C. (176° F.), the contact angle increased for R=Me, Octyl, indicating more condensation between the alkoxy groups. In various embodiments, a greater contact angle refers to a greater hydrophobicity, which may result in less water accumulating on a stainless steel surface coated with the hybrid Si-Quat coating. Thus, a faucet having the hybrid Si-Quat coating may have significantly less water accumulation during use by having a hybrid Si-Quat coating disclosed herein relative to typical faucets for use in aircraft faucet systems, in accordance with various embodiments.

In various embodiments, the method 600 may further comprise verifying the Si-Quat coating has been formed on the surface of the stainless steel component (step 614). In various embodiments, the Si-Quat coating may be verified by any method known in the art, such as bacteria reduction tests shown below in Table 3.

TABLE 3.

Antimicrobial tests of Si—OH/Si—OEt activated stainless steel plates covalent-bonded with coating 3-(Trihydroxysilyl)propyldimethyloctadecyl ammoniumchloride

| Stainless Steel Substrates | Surface Si—OH/Si-OEt activation | Grafting Si-Quat coating | E-Coli reduction test Per JIS Z 2801:2010 in comparison with SS substrate control |
|---|---|---|---|
| SS316 bead blasted - McMaster 88885K24, blasted, nitric acid Passivated | piranha treated, followed by soaking in SIT7110.0‡ overnight, heated at oven 85° C. (185 F.°) 24 hours | soaked in HM4005* (diluted to 2.5%) 2 days, cured at 85° C. (185° F.) for 48 hours | 99.99995% |
| ZSS316 brushed - McMaster 9745K74, nitric acid passivated | piranha treated, followed by soaking in SIT7110.0-3KG* overnight, heated at oven 85° C. (185 F.°) 24 hours | soaked in HM4005* (diluted to 2.5%) 2 days, cured at 85° C. (185° F.) for 48 hours | 99.998% |
| SS304 brushed - McMaster 9748K24, nitric acid passivated | piranha treated, followed by soaking in SIT7110.0-3KG* overnight, heated at oven 85° C. (185 F.°) 24 hours | soaked in HM4005* (diluted to 2.5%) 2 days, cured at 85° C. (185° F.) for 48 hours | 99.99994% |

*Gelest HM 4005: 3-(Trihydroxysilyl)propyldimethyloctadecyl ammoniumchloride, 5% aqueous solution;

‡ Gelest SIT7110.0: tetraethoxysilane, oligomeric hydrolysate

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of manufacturing an aircraft metallic faucet with an anti-microbial coating, the method comprising:
   disposing the aircraft metallic faucet in a heated acid bath and subsequently washing the aircraft metallic faucet;
   disposing the aircraft metallic faucet in a piranha solution;
   coating a surface of the aircraft metallic faucet with a Si-Quat coating, the Si-Quat coating including a Si-Quat that comprises one of (i) 1-octadecanaminium, N,N-dimethyl-N-(3-(trimethoxsil) propyl) chloride; (ii) 1-tetradecanaminium, N,N-dimethyl-N-(3 (trimethoxysilyl) propyl) chloride; (iii) 1-decanaminium, N-didecyl-N-methyl-N-(3-(trimethoxysilyl) propyl) chloride; and (iv) 1-ocatdecananminium, N,N-dimethyl-N-(3-(trihydroxysilyl) propyl) chloride.

2. The method of claim 1, wherein coating the surface further comprises disposing the surface in a Si-Quat solution.

3. The method of claim 2, wherein:
   coating the surface further comprises curing casted Si-Quat solution at a temperature between 60° C. (140° F.) and 100° C. (212° F.) to form the Si-Quat coating, and curing the Si-Quat coating is performed for at least 24 hours.

4. The method of claim 1, wherein coating the surface further comprises coating the surface via drop casting or dip coasting.

5. The method of claim 1, wherein the Si-Quat coating comprises approximately 2% $(OH)_3$—Si-Quat.

6. The method of claim 1, wherein the aircraft metallic faucet is a stainless steel component.

7. The method of claim 1, wherein subsequent to washing the aircraft metallic faucet, the faucet is treated with at least one of tetraethoxysilane or tetraethoxysilane oligomeric hydrolysate.

8. A method of manufacturing an aircraft metallic faucet with a hybrid anti-microbial coating with crosslinkers, the method comprising:
   disposing the aircraft metallic faucet in at least one of a piranha solution and a second solution comprising tetraethoxysilane, oligomeric hydrolysate and subsequently washing the aircraft metallic faucet;
   coating a surface of the aircraft metallic faucet with a hybrid Si-Quat coating including the crosslinkers, the Si-Quat coating including a weight ratio of Si-Quat:alkoxysilanes of between 1:1 and 2:1, the Si-Quat including one of (i) 1-octadecanaminium, N,N-dimethyl-N-(3-(trimethoxsil) propyl) chloride; (ii) 1-tetradecanaminium, N,N-dimethyl-N-(3-(trimethoxysilyl) propyl) chloride; (iii) 1-decanaminium, N-didecyl-N-methyl-N-(3-(trimethoxysilyl) propyl) chloride; and (iv) 1-ocatdecananminium, N,N-dimethyl-N-(3-(trihydroxysilyl) propyl) chloride; and
   curing the hybrid Si-Quat coating at a temperature between 60° C. (140° F.) and 100° C. (212° F.).

9. The method of claim 8, wherein a Si-Quat in the hybrid Si-Quat coating with crosslinkers comprises $(MeO)_3$—Si-Quat and the alkoxysilanes comprises R—Si—$(OEt)_3$ (R=Me, EtO, Octyl, perfluorooctyl).

10. The method of claim 8, wherein the aircraft metallic faucet is a stainless steel component.

11. The method of claim 8, further comprising preparing a hybrid Si-Quat solution including crosslinkers prior to coating the surface of the aircraft metallic faucet.

12. The method of claim 8, wherein preparing the hybrid Si-Quat solution with crosslinkers includes mixing $(MeO)_3$ Si-Quat with MeOH, excess water, and one of tetraethoxysilane, octyltriethoxysilane, methyltriethoxysilane and perfluorooctyl).

13. The method of claim 8, wherein the surface is an interior surface of the aircraft metallic faucet.

14. The method of claim 8, wherein the aircraft metallic faucet includes an aerator for an aircraft faucet system, the aerator coated in accordance with the aircraft metallic faucet.

15. An aircraft metallic faucet, processed with the method of claim 1, comprising:
   a surface; and
   a hybrid anti-microbial coating with crosslinkers disposed on the surface.

16. The aircraft metallic faucet of claim 15, wherein the hybrid anti-microbial coating with crosslinkers has a contact angle greater than 90 degrees.

17. The aircraft metallic faucet component of claim 15, wherein the aircraft metallic faucet is a stainless steel component.

18. The aircraft metallic faucet of claim 15, the hybrid anti-microbial coating comprises a weight ratio of Si-Quat:Alkoxysilanes of between 1:1 and 2:1.

19. The aircraft metallic faucet of claim 18, wherein a Si-Quat in the hybrid anti-microbial coating comprises $(MeO)_3$—Si-Quat and the alkosyilanes comprises R—Si—$(OEt)_3$ (R=Me, EtO, Octyl, Perfluorooctyl).

* * * * *